US006989188B2

(12) United States Patent
Brunnhofer et al.

(10) Patent No.: US 6,989,188 B2
(45) Date of Patent: Jan. 24, 2006

(54) SPACER PROFILES FOR DOUBLE GLAZINGS

(75) Inventors: Erwin Brunnhofer, Fuldabrück (DE); Jörg Lenz, Habichtswald-Ehlen (DE)

(73) Assignee: Technoform Caprano und Brunnhofer GmbH & Co. KD, Fuldabruck (DE)

( * ) Notice: Subject to any disclaimer, the term of this patent is extended or adjusted under 35 U.S.C. 154(b) by 8 days.

(21) Appl. No.: 10/794,266

(22) Filed: Mar. 5, 2004

(65) Prior Publication Data

US 2005/0100691 A1 May 12, 2005

Related U.S. Application Data

(60) Provisional application No. 60/518,215, filed on Nov. 7, 2003.

(51) Int. Cl.
*B32B 3/20* (2006.01)
*E06B 3/24* (2006.01)
*E04C 2/54* (2006.01)

(52) U.S. Cl. ........................ 428/188; 428/34; 52/786.13

(58) Field of Classification Search .................. 428/34, 428/36.9, 122, 126, 137, 167, 172, 188, 189; 52/172, 786.1, 786.13
See application file for complete search history.

(56) References Cited

U.S. PATENT DOCUMENTS

| | | | |
|---|---|---|---|
| 4,057,945 | A | 11/1977 | Kessler |
| 4,222,213 | A | 9/1980 | Kessler |
| 5,079,054 | A | 1/1992 | Davies |
| 5,087,489 | A | 2/1992 | Lingemann |
| 5,094,055 | A | 3/1992 | Berdan |
| 5,106,663 | A | 4/1992 | Box |
| 5,260,112 | A | 11/1993 | Grether et al. |
| 5,313,762 | A | 5/1994 | Guillemet |
| 5,424,111 | A | 6/1995 | Farbstein |
| 5,439,716 | A | 8/1995 | Larsen |
| 5,460,862 | A | 10/1995 | Roller |
| 5,485,709 | A | 1/1996 | Guillemet |
| 5,512,341 | A | 4/1996 | Newby et al. |
| 5,514,432 | A | 5/1996 | Lisec |
| 5,630,306 | A | 5/1997 | Wylie |
| 5,655,282 | A | 8/1997 | Hodek et al. |
| 5,675,944 | A | 10/1997 | Kerr et al. |
| 5,679,419 | A | 10/1997 | Larsen |
| 5,714,214 | A | 2/1998 | Larsen |
| 5,806,272 | A | 9/1998 | Lafond |
| 5,854,609 | A | 12/1998 | Pyo et al. |
| 5,962,090 | A | 10/1999 | Trautz |
| 5,983,593 | A | 11/1999 | Carbary et al. |
| 6,035,596 | A | 3/2000 | Brunnhofer |

(Continued)

FOREIGN PATENT DOCUMENTS

| | | |
|---|---|---|
| DE | 3302659 | 8/1984 |
| EP | 0003715 | 8/1979 |
| WO | WO 03/074830 | 9/2003 |
| WO | WO 03/074831 | 9/2003 |

*Primary Examiner*—Donald J. Loney
(74) *Attorney, Agent, or Firm*—Tucker Ellis & West LLP

(57) ABSTRACT

Spacer profiles (1) for double glazing units (20) may include a deformable profile body having first and second side walls (3) extending from a base wall (2). First and second connecting segments (5) respectively connect the first and second side walls (3) to an upper wall (4) and respectively define inwardly projecting grooves (9). A hollow chamber (7) may include a first space (11) disposed adjacent to the base wall (2), which first space (11) has a greater width than a second space (10) disposed adjacent to the upper wall (4). Further, the profile body preferably has a heat conductivity of less than about 0.3 W/(m·K). A reinforcement layer (6) may be permanently coupled to at least the upper wall (4), the first and second connecting segments (5), and the first and second side walls (3), and preferably has a heat conductivity of less than about 50 W/(m·K).

30 Claims, 2 Drawing Sheets

U.S. PATENT DOCUMENTS

| | | | | | |
|---|---|---|---|---|---|
| 6,035,602 | A | | 3/2000 | Lafond | |
| 6,061,994 | A | | 5/2000 | Goer et al. | |
| 6,112,477 | A | | 9/2000 | Spinks | |
| 6,192,652 | B1 | | 2/2001 | Goer et al. | |
| 6,212,756 | B1 | | 4/2001 | Ferri | |
| 6,238,755 | B1 | | 5/2001 | Harvey et al. | |
| 6,301,858 | B1 | | 10/2001 | Crandell | |
| 6,339,909 | B1 | * | 1/2002 | Brunnhofer et al. | 52/786.13 |
| 6,389,779 | B1 | * | 5/2002 | Brunnhofer | 52/786.13 |
| 6,491,992 | B1 | | 12/2002 | Koizumi et al. | |
| 6,528,131 | B1 | | 3/2003 | Lafond | |
| 6,537,629 | B1 | | 3/2003 | Ensinger | |
| 6,581,341 | B1 | | 6/2003 | Bartuci et al. | |
| 6,602,444 | B1 | | 8/2003 | Spinks | |

* cited by examiner

SPACER PROFILES FOR DOUBLE GLAZINGS

CROSS-REFERENCE

This application claims priority to U.S. provisional patent application No. 60/518,215, which was filed Nov. 7, 2003, the contents of which are incorporated by reference as if fully set forth herein.

TECHNICAL FIELD

The present invention relates to spacer profiles that can be formed (e.g., bent) into spacer frames for mounting within an insulating window unit (double glazing). The spacer profiles are designed to support and separate two window panes.

DESCRIPTION OF THE RELATED ART

Known spacer profiles are taught by commonly-owned U.S. Pat. Nos. 6,035,596, 6,389,779 and 6,339,909. Additional spacer profiles are taught by U.S. Pat. Nos. 5,460,862, 5,962,090, 6,061,994, 6,192,652 and 6,537,629, PCT Publication Nos. WO 03/74830 and WO 03/74831, European Patent Publication No. 0 003 715 and German Patent Publication No. 33 02 659.

Known insulating window units utilize two or more glass panes. The spacer profile is placed between two glass panes in order to support and separate the two glass panes. The space between the glass panes is then typically filed with an inert, insulating gas, such as argon, and the space is sealed. The window panes also may be coated or finished in order to impart special functions to the insulating window unit, such as increased heat insulating and/or sound insulating capabilities.

Insulating window units that are intended to provide high insulation values are typically designed to minimize the heat transmission characteristics of the peripheral connection(s), including the spacer frame. In addition, the spacer profile is preferably designed to minimize or eliminate the formation of water condensation on the inner surfaces of the window panes, even when subjected to cold outside temperatures. Moreover, the spacer profile preferably should be readily bendable even at relatively low temperatures (e.g., room temperature) without substantially deforming the structures defining the spacer profile.

SUMMARY OF THE INVENTION

It is one object of the present teachings to provide improved spacer profiles.

In one aspect of the present teachings, spacer profiles are taught that can be inexpensively manufactured in large volumes, while providing good heat insulating properties, minimizing water condensation inside the assembled insulating window unit (double glazing) and being readily bendable without undesired deformation. Such spacer profiles offer advantageous applications in the field of "warm-edge" insulating window units that seek to minimize or prevent water condensation on an inner surface of an inner window pane by maintaining the temperature at an edge connection area as high as possible, even when the outer window pane is subjected to relatively cold outside temperatures.

In another aspect of the present teachings, spacer profiles are taught that enable the production of one-piece spacer frames by bending a linear spacer profile. The resulting bent spacer frame does not have undesirable deformations, even when the spacer profile is bent while cold or only slightly warmed using conventional bending machinery. Further, insulating window units may be prepared by placing the bent spacer frame between two window panes in a manner and position that permits a limited range of relative movement by the window panes when the assembled insulating window unit is subjected to pressure changes and/or shearing strain.

In another aspect of the present teachings, spacer profiles preferably include a profile body comprising an elastically-plastically deformable material (e.g., a plastic or resin material) having relatively low heat conductivity. A deformable reinforcement material or layer (e.g., a metal) preferably is coupled to the elastically-plastically deformable material. Optionally, terminal end portions of the reinforcement layer may be or partially or completely embedded within the profile body. In another optional embodiment, the entire reinforcement layer may be partially or completely embedded (disposed) within the profile body. The combined structure (i.e., the profile body and the reinforcement layer, which will be referred to as a "spacer profile" herein) is preferably bendable without undesirable deformation of the inherent structures, even when bent at relatively low temperatures.

Preferred elastically-plastically deformable materials include synthetic or natural materials that undergo plastic, irreversible deformation after the elastic restoring forces of the bent material have been overcome. In such preferred materials, substantially no elastic restoring forces are active after deformation (bending) of the spacer profile beyond its apparent yielding point. Representative plastic materials also preferably exhibit a relatively low heat conductivity (i.e., preferred materials are heat-insulating materials), such as heat conductivities of less than about 5 W/(m·K), more preferably less than about 1 W/(m·K), and even more preferably less than about 0.3 W/(m·K). Particularly preferred materials for the profile body are thermoplastic synthetic material including, but not limited to, polypropylene, polyethylene terephthalate, polyamide and/or polycarbonate. The plastic material(s) may also contain commonly used fillers (e.g., fibrous materials), additives, dyes, UV-protection agents, etc.

Preferred plastically deformable reinforcement materials include metals that provide substantially no elastic restoring force after being bent beyond the apparent yielding point of the metal. Preferred materials for the profile body optionally exhibit a heat conduction value that is at least about 10 times less than the heat conduction value of the reinforcement material, more preferably about 50 times less than heat conduction value of the reinforcement material and most preferably about 100 times less than the heat conduction value of the reinforcement material.

In another aspect of the present teachings, spacer profiles preferably include a relatively large hollow inner space or chamber, which may be partially or completely coated and/or filled with a hygroscopic material (also known as a desiccant or drying agent). Preferably, the hygroscopic material is disposed in a manner that permits the hygroscopic material to communicate with the space (i.e., gas) defined between the window panes of the assembled insulating window unit (double glazing). In this case, the hygroscopic material can remove (absorb) moisture from the gas disposed between the window panes. By removing moisture, it is possible to minimize or prevent the formation of water condensation (fogging) on the inner surface(s) of the window pane(s). Two or more hygroscopic materials may be utilized in combination and the present teachings are not particularly limited concerning the types of hygroscopic materials that may be disposed within the hollow chamber of the spacer profile.

In one representative embodiment, the plastic portion (profile body) of the spacer profile may be permanently coupled (or materially connected) to the reinforcement layer, e.g., by co-extruding the profile body with the reinforcement layer. In the alternative, the reinforcement layer may be permanently coupled (materially connected) by laminating the reinforcement layer on the plastic portion and/or by disposing an adhesive between the plastic portion and the reinforcement layer. In this case, the reinforcement layer is preferably bonded to the profile body with a peeling value (force/adhesion width) of equal to or greater than 4 N/mm using a 180° peeling test on the finished product. A variety of manufacturing techniques may be utilized to make the spacer profiles of the present teachings, which manufacturing techniques are not particularly limited.

In another aspect of the present teachings, the cross-section of the hollow inner space or chamber of the spacer profile is preferably substantially T-shaped, bell-shaped or stepped pyramid-shaped. In other words, the width of the hollow inner space or chamber preferably decreases in the height direction of the spacer profile. The width of the hollow inner space or chamber may decrease continuously or in a step-wise manner, or partially continuously and partially step-wise. Various chamber designs are possible within this aspect of the present teachings, as will be discussed further below.

In one preferred example, the widest width space of the chamber preferably is adjacent to a base wall of the spacer profile. The base wall is designed to face the inner space defined between the two window panes when the insulating window unit is assembled. Further, a plurality of apertures is preferably defined in the base wall, thereby enabling the hygroscopic material disposed within the chamber to readily communicate with the inner space of the insulating window unit. Thus, by designing the chamber in this manner, a relatively large surface area of hygroscopic material faces the base wall and the inner space of the insulating window unit.

In another preferred example, the hollow chamber may be defined as containing a first space and a second space. The cross-section of one or both of the first space and second space may be substantially rectangular or oval shape. For example, the width of the first space is preferably greater than the width of the second space and the first space is closest to the base wall. The width direction of the first space and the second space is defined as being parallel to the base wall. The second space optionally may have a substantially square or circular shape in cross-section.

The reinforcement layer is preferably disposed on the side of the spacer profile (e.g., the upper wall of the spacer profile) that will face towards the outside of the insulating window unit after the spacer profile has been bent into the spacer frame. At least a portion of the reinforcement layer, such as peripheral terminal edge portions thereof, optionally may be partially or completely embedded within the spacer profile. As a result of the geometric configurations of the reinforcement layers taught herein, an arc-preserving bending resistance moment is imparted to the spacer profile. Such arc-preserving being resistance contributes to the cold pliability of the spacer profile, which permits bending of the spacer profile without undesirable deformations. In addition or in the alternative, the reinforcement layer and the side walls of the profile body may define a flush surface, if the reinforcement layer does not completely cover the side walls.

The reinforcement layer preferably extends continuously from a first side wall across an upper wall to a second side wall of the spacer profile. Further, the reinforcement layer preferably covers first and second connecting segments provided between the upper wall and the respective first and second side walls. By introducing additional bends, curves and/or angles along the lateral width of the reinforcement layer (i.e., from the first side wall to the second side wall), a relatively high arc-preserving bending resistance moment can be imparted to the spacer profile. In this case, although stronger bending forces may be required to bend the spacer profile to form the spacer frame (i.e., than the bending forces required to bend spacer profiles without such additional bends, curves or angles), the resulting spacer frame will have a particularly low resilience and a high degree of comer stiffness.

According to one advantageous embodiment of the present teachings, the connecting segments are preferably defined at corner portions of the hollow chamber. If the reinforcement material covers the connecting segments, the bending behavior and the heat insulating properties of the spacer profile are improved. In other words, the path of the reinforcement layer is preferably modified, such that the length of the reinforcement layer is greater than the distance between the two window panes in the insulating window unit. Such designs serve to improve the overall heat insulating properties of the spacer profile. In other words, if the reinforcement material is made of a metal that conducts heat relatively well, the overall heat conduction properties of the reinforcement material can be reduced by extending the length of the reinforcement material. For example, by introducing additional bends, curves or angles along the path of the reinforcement material, a longer heat conduction path is provided between the first window and the second window of the assembled insulated window unit, thereby reducing the overall heat conduction of the reinforcement layer.

In addition to advantageous mechanical properties, the reinforcement layer optionally also may possess gas and vapor barrier properties. The reinforcement layer is preferably resistant or substantially impermeable to gases diffusing therethrough in order to maintain the integrity of the insulating gas (e.g., argon) disposed between the window panes in the assembled window unit. A gas and vapor barrier can be achieved by utilizing a reinforcement layer, e.g., that comprises stainless steel foil having a thickness of less than about 0.2 mm, more preferably less than about 0.15 mm and most preferably less than or about 0.1 mm. The minimum thickness of the reinforcement layer is preferably selected so that the required stiffness of the spacer profile is achieved and the diffusion resistance is also maintained after bending, particularly in the bent areas or portions. Generally speaking, for the above-identified metallic materials, a minimum layer thickness of about 0.02 mm is appropriate, although thicknesses between about 0.5 and 2.0 mm are preferable.

Depending on the manner in which the spacer profile is finally integrated within the insulating window unit, it can be advantageous to also provide a protective layer on the exposed side of the reinforcement layer, which exposed side may be sensitive to mechanical and/or chemical influences. Representative protective layers include, e.g., lacquer and/or plastic materials. In addition or in the alternative, a thin layer of the heat-insulating material may be provided on the reinforcement layer, such as a material exhibiting relatively low heat conductivity. Such a thin layer optionally may be embedded in one or more portions of the spacer profile.

Generally speaking, the walls of the spacer profile that define the chamber may have substantially the same wall thickness. It is preferable to maximize the volume of the chamber, which will maximize the amount of hygroscopic material that may be disposed within the chamber. For example, the wall thickness of one or more of the walls is preferably minimized in order to maximize the chamber volume.

The present spacer profiles enable the manufacture of insulating window units from a single linear piece that is only required to be bent and then closed by one connector. For example, commercially available bending tools may be easily utilized to bend the spacer profile so as to provide comers. Preferably, even after being bent, the surfaces of side walls of the spacer profile preferably remain planar (substantially flat), and substantially perpendicular to the base wall, so that the side surfaces will be parallel, or substantially parallel, to the respective window panes in the assembled insulating window unit. If the elastically-plastically deformable, heat-insulating material is permanently coupled (bonded) to the plastically deformable reinforcement layer, a good balance of forces is imparted to the spacer profile, even during cold bending. However, the expected bending points of the spacer profile may be slightly warmed before bending in order to accelerate relaxation of the spacer profile and reinforcement layer at the portions that will be bent. Moreover, various connectors may be suitably utilized to connect the terminal ends of the bent spacer frame, including corner connectors and straight connectors.

According to another advantageous embodiment, a mechanically stabilizing sealing material may completely fill up the free space defined along the outer peripheral margin of the assembled insulating window unit, or may substantially fill up that free space. Commercially available insulating glass adhesives containing polysulfides, polyurethanes or silicons are suitable sealing materials. Further, butyl sealing materials, e.g., containing polyisobutylenes, are suitable diffusion-resistant adhesive materials for bonding the side walls of the spacer frame to the respective window panes.

Further objects, aspects and advantages of the present teachings will be readily understood after reading the following description with reference to the drawings and the appended claims.

DETAILED DESCRIPTION OF THE INVENTION

Figure 1:
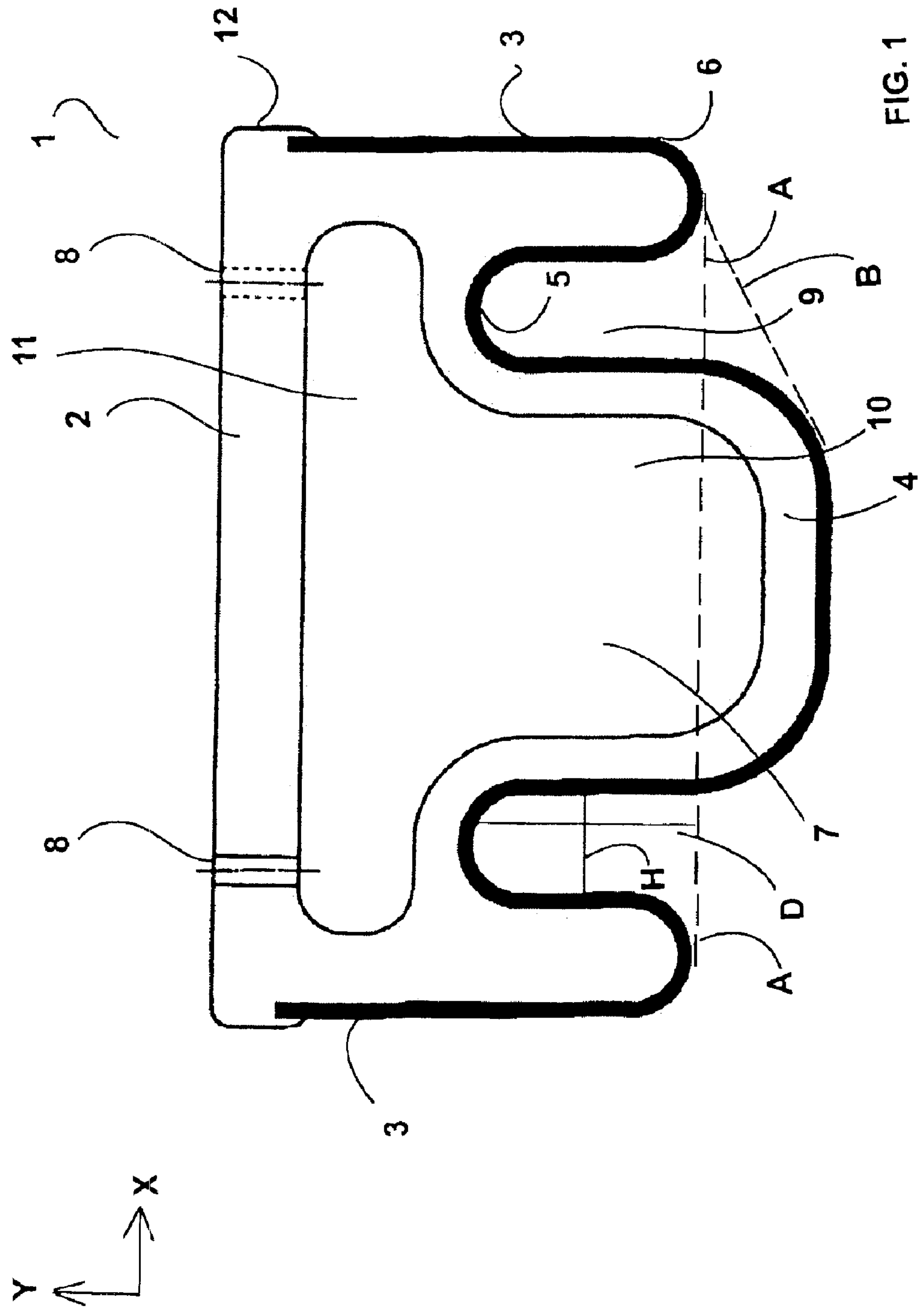
FIG. 1 shows a representative spacer profile according to the present teachings.

In one embodiment of the present teachings, spacer profiles may include a profile body having a base wall, first and second side walls extending from the base wall, and an upper wall extending substantially in parallel with the base wall. A first connecting segment preferably connects the first side wall to the upper wall and a second connecting segment preferably connects the second side wall to the upper wall. The first and second connecting segments respectively may define an inwardly curved or angled (e.g., substantially V-shaped or U-shaped) groove (or recess) between the upper wall and the respective first and second side walls. In addition, the profile body preferably is formed as a single, integral, continuous piece without borders (interfaces) between the various components thereof (i.e., no interfaces between the upper wall, side walls, base wall, and connecting segments). In addition, the profile body preferably comprises an elastically-plastically deformable material having a heat conductivity of less than about 0.3 W/(m·K). Such profile bodies can be readily manufactured using known extrusion techniques.

A hollow chamber is defined within the profile body. Preferably, the hollow chamber includes a first space in communication with a second space. The first space is defined adjacent to the base wall and the second space is defined adjacent to the upper wall. Preferably, the first space has a greater width than the second space along a lateral or transverse direction of the elongated spacer profile.

A reinforcement layer may be permanently coupled or bonded to at least the upper wall, the first and second connecting segments, and the first and second side walls. The reinforcement layer preferably has a heat conductivity of less than about 50 W/(m·K) and optionally is resistant to diffusion of gas and vapor therethrough.

The hollow chamber may have a cross-section selected from the group consisting of substantially T-shaped, substantially bell-shaped, substantially pyramid shaped and substantially stepped-shaped. In addition or in the alternative, the first and second spaces are each substantially rectangular shaped and the first space optionally may have a larger cross-sectional area than the second space. In another alternative definition of the chamber dimensions, the chamber may comprise a central space communicating with two laterally peripheral spaces, which laterally peripheral spaces are bounded by the base wall, but are not bounded by the upper wall. As noted above, a hygroscopic material optionally may be disposed within the hollow chamber and a plurality of apertures may be defined in the base wall.

The reinforcement layer of the spacer profile preferably has a breaking elongation of at least 20% and more preferably about 25–30%. The reinforcement layer preferably may comprise a stainless steel layer having a thickness of less than about 0.2 mm, or more preferably equal to or less than about 0.1 mm. More preferably, the heat conductivity of the reinforcement layer is equal to or less than about 15 W/(m·K). Further, the spacer profile optionally may have an overall tensile strength of about 350–370 N/mm$^2$.

The reinforcement layer preferably extends continuously from the first side wall to the second side wall. The profile body may be formed as one continuous, integral piece (i.e., without interfaces between the various components of the profile body) and may comprise one or more of polypropylene, polyethylene terephthalate, polyamide and/or polycarbonate. The profile body may be reinforced or not reinforced. If reinforced, the profile body may comprise one or more fibrous materials, such as a glass fiber, a carbon fiber and/or a natural fiber, dispersed within the profile body. Optionally, the profile body may contain glass particles, such as fiberglass, and/or a filler, such as talc, dispersed therein.

Optionally, the grooves (or recesses) respectively defined within the connecting segments may have a substantially U-shaped cross-section (e.g., the grooves are inwardly curved, but have substantially parallel opposing walls) or may have a substantially V-shaped cross-section (e.g., the opposing walls are not parallel to each other). If the cross-section of the groove is substantially V-shaped, the opposing walls of the groove preferably may define an acute angle or a right angle. In one embodiment of a connector segment-having a substantially V-shaped groove defined therein, the opposing walls of the groove may define an angle of about 60–90°. A hypothetical vertex formed by the intersection of the opposing walls of the connecting segments is preferably disposed inwardly of a hypothetical line connecting a terminal end of the respective side wall to the terminal end of the upper wall. However, even if the groove is substantially V-shaped, it is not necessary for the opposing walls to intersect at a point. Instead, the opposing walls may be connected by a rounded or curved portion. The cross-section of the rounded or curved portion optionally may be substantially circular or substantially oval.

In addition or in the alternative, each of the first and second connecting segments may include a first portion (first opposing wall) extending substantially perpendicularly from the upper wall and a second portion (second opposing wall) connecting the first portion to the respective side wall. Optionally, the respective second portions of the first and second connecting segments may each extend substantially perpendicularly from the respective side wall. In addition or in the alternative, the first and second grooves may each extend (inwardly) toward the base wall below a hypothetical line connecting a terminal end of the first side wall and a terminal end of the second side wall, which terminal ends are opposite of the base wall.

Further, the first and second grooves optionally may each have a depth that is between about 0.1 and 1 times the length of the first portions. In addition or in the alternative, the depth of the first and second grooves may be between about 0.5 to 5 times the thickness of the side walls. In addition or in the alternative, the depth of the first and second grooves is preferably less than twice the width of the first and second grooves. More preferably, the depth of the grooves is equal to or less than the width of the grooves.

An assembled insulating window unit preferably may include a first window pane disposed substantially in parallel with a second window pane. A spacer frame is preferably formed by bending and connecting the terminal ends of any one of the spacer profiles described above or below. The bent spacer frame is disposed between and supports the first and second window panes. The respective side walls of the spacer frame may be adhered to the first and second window panes using an adhesive. Further, the base wall of the spacer frame is preferably oriented toward a space defined between the first and second window panes. In this case, the upper wall of the spacer frame is thus oriented toward an outer peripheral edge of the first and second window panes. In addition, a mechanically stabilizing sealing material is preferably disposed on the upper wall between the first and second window panes.

Each of the additional features and teachings disclosed below may be utilized separately or in conjunction with other features and teachings to provide improved spacer profiles and methods for designing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

FIG. 1 shows a cross-section of a representative spacer profile 1 according to the present teachings. A chamber (or hollow space) 7 is preferably defined by a base wall 2, a pair of side walls 3 and an upper wall 4. Connecting segments 5 connect the respective side walls 3 to the upper wall 4. The base wall 2 is preferably longer than the upper wall 4. The side walls 3 preferably have the same length. For purposes of reference, FIG. 1 shows a cross-section of the representative spacer profile 1 along a Z direction thereof and defines an X direction and a Y direction of the spacer profile 1. In other words, the Z direction is perpendicular to the X and Y directions and extends perpendicularly to the drawing sheet. Thus, the base wall 2 and the upper wall 4 extend substantially in the X direction and the side walls 3 extend substantially in the Y direction. The entire spacer profile 1 is elongated in the Z direction. Herein, the X direction will also be referred to as the width direction of the spacer profile 1 and the Y direction will also be referred to as the height direction of the spacer profile 1.

This embodiment, the chamber 7 has a substantially T-shaped or bell-shaped cross-section. For example, the chamber 7 may include a base (first) space 11 closest to the base wall 2 that has a longer width or lateral dimension (i.e., along the X direction) than an upper (second) space 10 closest to the upper wall 4. As was discussed above, in other embodiments, the chamber 7 may have a cross-section that is substantially stepped-shaped or pyramid-shaped. In other words, the chamber 7 preferably includes laterally peripheral spaces (i.e., along the X direction) adjacent to the base wall 2, which laterally peripheral spaces are tapered or step-wise terminated along the height direction (i.e., the Y direction) towards the upper wall 4. In addition, the comers of the chamber 7 may be substantially rounded or curved, as shown in FIG. 1, or the corners may be angular, such as right angles, acute angles or obtuse angles.

The inner surface of the chamber 7 is preferably coated with a hygroscopic material, such as a silica gel or molecular sieves, and/or the chamber 7 may be filled, or substantially filled, with the hygroscopic material or a material that comprises, at least in part, a hygroscopic material. A plurality of apertures 8 is preferably defined, e.g., in the base wall 2, to permit communication with the chamber 7. Preferred hygroscopic materials are capable of absorbing moisture from the gas (e.g., argon) disposed between the window panes of the assembled insulting window unit. Thus, by providing the apertures 8, the chamber 7 can communicate with the gas disposed between the window panes in order to remove moisture from the gas. As a result, the assembled window unit (double glazing) can be prevented from fogging (i.e., condensed water) on the inside of the window panes during cold weather conditions, because the hygroscopic material maintains the insulating gas in a relatively dry (low humidity) state.

The side walls 3 preferably each have a length (height) that is less than the distance between the outer peripheral surfaces of the base wall 2 and the upper wall 4. As shown in FIG. 1, a groove (or recess) 9 is defined by the side wall 3, the upper wall 4 and the connecting segment 5. However, the groove 9 may be defined by only the connecting segment 5 or by the connecting segment 5 and one of the side wall 3 and the upper wall 4. Further, the shape of the groove 9 is not particularly limited according to the present teachings, as the groove 9 may be, e.g., inwardly curved or angled.

Preferably, the groove 9 extends at least partially inward (i.e., towards the center or the base wall 2 of the spacer profile 1) of a hypothetical line B connecting the terminal end of the side wall 3 (which terminal end is closest to the upper wall 4) and the terminal end of the upper wall 4 (which terminal end is closest to the side wall 3). In addition or in the alternative, the groove 9 extends at least partially inward of a hypothetical line A connecting the terminal ends of the first and second side walls 3. The size of the side walls 3, upper wall 4 and connecting segments 5 may be suitably modified in order to provide various shapes for the groove 9. For example, the side walls 3, connecting segments 5 and upper wall 4 may be preferably designed such that the depth D of the groove 9 is less than twice the width H of the groove 9 and more preferably, the depth D is less than or equal to the width H.

In the embodiment shown in FIG. 1, the groove 9 is substantially U-shaped. However, in another preferred embodiment, the groove 9 may be rather shallow and defined substantially as a right angle. In another embodiment, the connecting segments 5 may define substantially an acute angle therebetween. For example, the opposing walls of the groove 9 may define an angle of between about 60–90°.

In addition or in the alternative, the connecting segments 5 may extend from substantially the terminal ends of the respective side walls 3. In this case, the connecting segments 5 may extend, e.g., substantially perpendicularly from the terminal ends of the side walls 3. As a result, the connecting segments 5 may connect to the upper wall 4 at substantially a right angle or a relatively large acute angle. In such an embodiment, the upper space 10 and the base space 11 may each have a substantially rectangular cross-section. The width of the upper space 10 (i.e., along the X direction) is preferably less than the width of the base space 11. Optionally, the upper space 10 also may comprise a larger cross-sectional area than the cross-sectional area of the base space 11.

The side walls 3 preferably extend substantially in parallel along the height or Y direction of the spacer profile 1, as shown in FIG. 1. Each of the walls 2, 3, 4, and the connecting segments 5 may have substantially the same thickness. Further, the material for the walls 2, 3 and 4 and the connecting segments 5 is preferably diffusion-proof (impermeable) or diffusion-resistant (substantially impermeable), so as to prevent or at least minimize the diffusion (transmission) of gases or liquids through the spacer profile 1. In addition or in the alternative, a layer of diffusion-proof material may be disposed on an outer surface of the spacer profile 1 in order to prevent diffusion of substances, such as water and atmospheric gases (e.g., nitrogen and oxygen), through the spacer profile 1 so as to maintain the integrity of the insulating gas (e.g., argon) disposed between the window panes of the assembled double glazing.

Preferably, a reinforcement material (layer) 6 is disposed along at least the upper wall 4 of the spacer profile 1. More preferably, the reinforcement material 6 also extends along the connecting segments 5 and the side walls 3. By covering the side walls 3 with the reinforcement material 6, improved adhesion properties may be attained when the spacer profile 1 is adhered or bonded to the window panes to form the assembled double glazing. Moreover, the spacer profile 1 will have improved bending properties, due to the permanently bonded sandwich structure (i.e., the connecting segments 5 and the side walls 3 are surrounded by the reinforcement layer 6). The reinforcement material 6 may be disposed on the outer surface of the spacer profile 1, or may be partially or completely embedded within the spacer profile 1. In the latter case, a protrusion 12 of the side wall 3 may overlap the terminal end of the reinforcement material 6.

If the reinforcement material 6 comprises a metal, a heat-conductive path will be defined through the reinforcement material 6 from one side wall 3, which will be closest to a first window pane, to the other side wall 3, which will be closest to a second window pane. However, as discussed herein, additional measures can be taken to reduce the heat-conductivity of this path in order to improve the overall insulating properties of the spacer profile 1.

In one modification of the spacer profile 1 shown in FIG. 1, the base wall 2 may be replaced with a porous material that permits moisture to diffuse into the chamber 7. In this case, the apertures 8 optionally may be eliminated.

In addition or in the alternative, either another reinforcement material or the same reinforcement material 6 may partially or completely cover the outer surface of the base wall 2. In addition or in the alternative, a decorative layer and/or a heat radiation reflecting layer optionally may be disposed on the outer surface of the base wall 2.

Optionally, the side walls 3 may extend from the base wall 2 at other than a right angle. For example, the side walls 3 may extend outwardly from the edge of the base wall 2 so as to form an obtuse or acute angle with the base wall 2.

In another optional modification of the representative embodiment shown in FIG. 1, the base wall 2 may be omitted. In that case, the chamber 7 may be designed as a trough or channel. The hygroscopic material may be embedded in a polymer matrix that is disposed in the trough/channel, thereby filling or substantially filling the trough/channel. Optionally, an adhesive may be coated on the inner surface of the trough/channel before filling the trough/channel with the polymer matrix. Moreover, in this optional embodiment, the reinforcement material 6 may be first disposed along the inner surface of the trough/channel before filling the trough/channel with the polymer matrix. In this case, the reinforcement material 6 optionally need not be disposed along the outer surface of the upper and side walls 4 and 6 and the connecting segments 5.

The spacer profile 1 is preferably bendable so as to form a support frame. More preferably, the spacer profile 1 is bendable without undesirable deformation along the side walls 3 of the corner portion, even when the spacer profile 1 is bent at a relatively low temperature (e.g., room temperature). The bent support frame is then disposed between a pair of window panes 23 to form an assembled double glazing structure (insulating window unit) 20. One representative embodiment of a double glazing structure 20 according to the present teachings is shown in FIG. 2 and is discussed further below.

Figure 2:
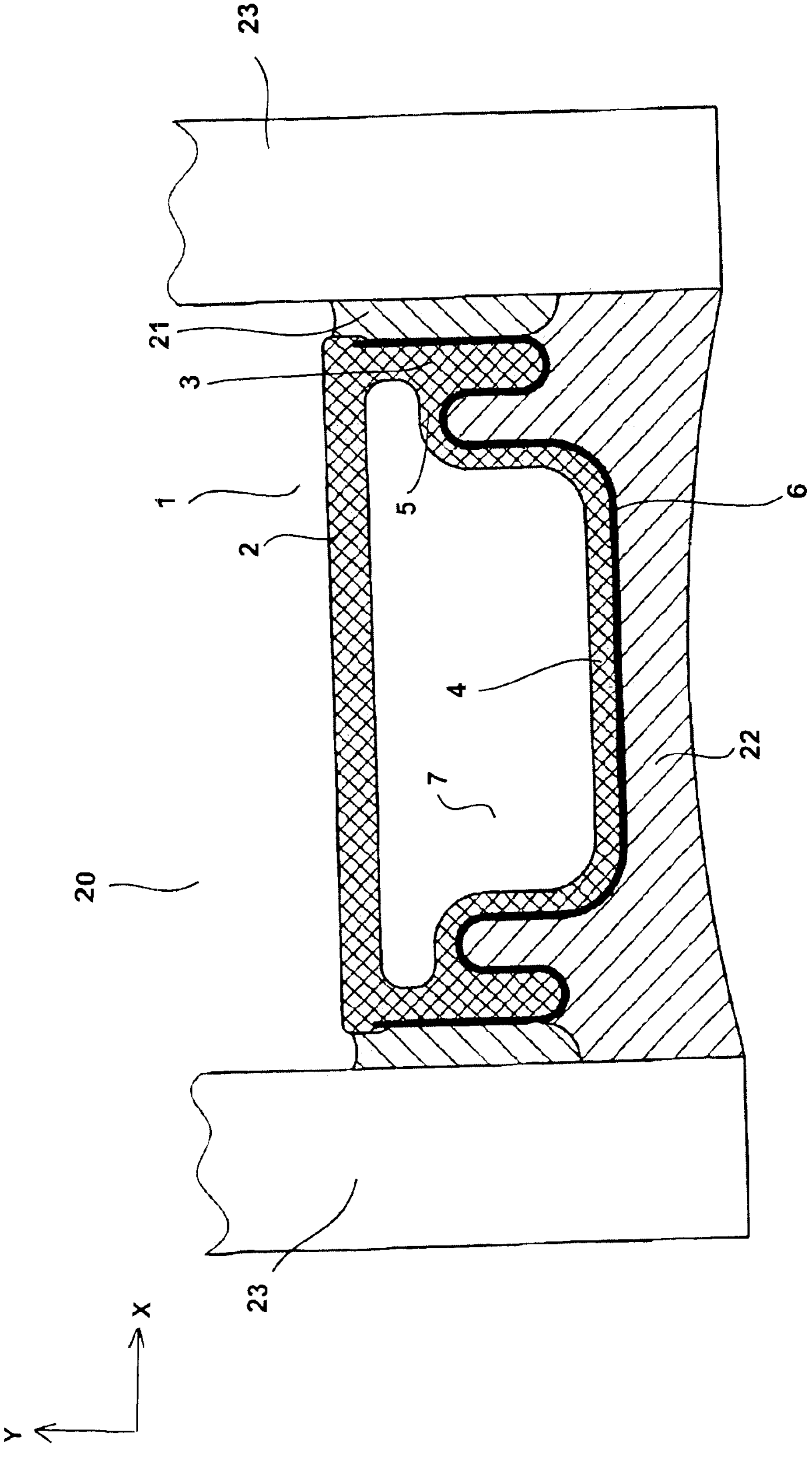
FIG. 2 shows the representative spacer profile of FIG. 1, which has been bent into a spacer frame and disposed between two window panes to form an assembled double glazing (insulating window unit).

Referring to FIG. 2, the respective side walls 3 of the spacer profile 1 preferably support the respective inner surfaces of the window panes 23. Preferably, even after being bent, the side walls 3 remain substantially perpendicular to the base wall 2 so that the side walls 3 are parallel, or substantially parallel, to the window panes 23 in the assembled double glazing 20. Further, in order to protect the reinforcement material 6, a protective layer optionally may be disposed along the outer surface of the reinforcement material 6 before inserting the spacer profile 1 between the window panes 23.

Sealing material 22 preferably serves to support the spacer profile 1 between the window panes 23 and imparts an airtight, or substantially air-tight, seal. In addition, an adhesive material 21 is preferably disposed between the side walls 3 and the window panes 23. For example, the spacer profile 1 may be first affixed to the respective inner surfaces of the window panes 23 using the adhesive 21. Then, the remaining space may be filled with a mechanically stabilizing sealing material 22, which also preferably provides an airtight/watertight seal or a substantially airtight/watertight seal. In other words, the sealing material 22 is preferably selected so as to prevent or minimize moisture, and other undesirable gases, from entering into the enclosed space between the window panes 23 in the assembled double glazing structure 20.

In an optional modification of the double glazing structure shown in FIG. 2, two or more different sealing materials 22 may be utilized to fill the outer or peripheral space bounded in part by the spacer profile 1 and the window panes 23. For example, a first sealing material 22 may be filled into the space and allowed to set. Thereafter, a second sealing material 22 may be disposed, at least partially, over the first sealing material 22.

In particularly preferred embodiments of the present teachings, the base, side and upper walls 2, 3, 4 and the connecting segments 5 may comprise polypropylene Novolen 1040K and may have a wall thickness of about 1 mm. In the alternative, the base, side and upper walls 2, 3, 4 and the connecting segments 5 may comprise polypropylene MC208U, which comprises 20% talc, or polypropylene BA110CF, which is a heterophasic copolymer, both of which are available from Borealis A/S of Kongens Lyngby, Denmark. In the alternative, the base, side and upper walls 2, 3, 4 and the connecting segments 5 may comprise Adstift® HA840K, which is a polypropylene homopolymer available from Basell Polyolefins Company NV.

The reinforcement material 6 may be a metal foil or thin metal plate material, e.g., Andralyt E2, 8/2, 8T57, and may have a thickness of about 0.1 mm. The metal material 6 may be co-extruded with or laminated onto the upper and side walls 3, 4 and the connecting segments 5. For example, the reinforcement material 6 may be adhered to the plastic portion of the spacer profile 1 using a 50 micron layer of a bonding agent (adhesive), such as a polyurethane and/or a polysulfide. Further, the outer side of the metal foil or thin metal plate (film) preferably has been treated to prevent corrosion (e.g., rust).

In an optional embodiment, the reinforcement material 6 may be a tin-plated iron foil. The base portion of the tin-plated iron foil may have a chemical composition of: carbon 0.070%, manganese 0.400%, silicon 0.018%, aluminum 0.045%, phosphorus 0.020%, nitrogen 0.007%, the balance being iron. A tin layer having a weight/surface ratio of 2.8 g/$m^2$ may be applied to the base portion at a thickness of about 0.38 microns.

In the alternative, the reinforcement material 6 may preferably comprise a stainless steel foil, e.g., Krupp Verdol Aluchrom I SE, having a thickness of about 0.05–02 mm, more preferably about 0.05 mm to 0.2 mm and most preferably about 0.1 mm. The chemical composition of this stainless steel may be approximately: chromium 19–21%, carbon maximum 0.03%, manganese maximum 0.50%, silicon maximum 0.60%, aluminum 4.7–5.5%, the balance being iron.

In the alternative, the reinforcement material 6 may comprise aluminum metal having a thickness of about 0.2–0.4 mm.

In the alternative, a galvanized iron/steel sheet having a thickness of about 0.1–0.15 mm may be utilized as the reinforcement material 6.

Although various dimensions are possible in accordance with the present teachings, the assembled spacer profile 1 preferably may have a width (X direction) of about 16 mm and a height (Y direction) of about 6.5 mm. The chamber 7 may have a height of about 5 mm. The base space 11 of the chamber 7 may have a width of about 13.5 mm and the upper space 10 of the chamber 7 may have a width of about 10 mm.

The chamber 7 may be filled with a known drying agent (hygroscopic material), such as the molecular sieve Phonosorb 555, which is manufactured by W.R. Grace & Company. As discussed above, two rows of apertures 8 may be provided in the base wall 2, so that the drying agent can communicate with the space between the window panes 23.

The elongated spacer profile 1 optionally may be cut into lengths (i.e., along the Z direction) of 6 meters (20 feet) and then further processed using known bending devices in order to form the support frame. For example, the automatic bending machine made by F.X. BAYER can be utilized to form type VE spacer frames cut to customized dimensions. The spacer profile 1 may be bent to form four comers therein and the terminal ends of the bent spacer profile 1 may be connected using a straight connector to form the spacer frame.

Known techniques may be utilized to connect the support frame to two large float-glass panes 23 to form the assembled insulating window unit (double glazing structure) 20. One of the window panes 23 optionally may be provided with a heatprotective layer having an emittance of about 0.1. The enclosed space defined between the window panes 23 and bounded by the spacer frame may be filled with argon or another inert and/or insulating gaseous substance. In a particularly preferred embodiment, the enclosed space has an argon content of at least about 90% of the total gas volume within the enclosed space.

The adhesive 21 preferably may be a butyl sealing material, such as polyisobutylene. The adhesive 21 may have a width of about 0.25 mm and a height of about 4 mm. The sealing material 22 may be a polysulfide adhesive having a thickness of about 3 mm.

In preferred embodiments, the reinforcement layer 6 and the plastic portion (profile body) of the spacer profile 1 may exhibit the following preferred properties. The reinforcement layer 6 and the profile body of the spacer profile 1 respectively may have an elastic modulus of about 180–220 kN/$mm^2$ and about 1.5–2.5 kN/$mm_2$. In addition or in the alternative, the reinforcement layer 6 and the profile body of the spacer profile 1 respectively may have a tensile strength of about 350–650 N/$mm^2$ and 35–40 N/$mm^2$. The spacer profile 1 (i.e., the combined plastic portions (spacer body) and the reinforcement material 6) preferably has a total or overall tensile strength of about 350–370 N/$nmm^2$.

In addition or in the alternative, the reinforcement layer 6 and the plastic portion of the spacer profile 1 respectively may have an elasticity limit or yield point of about 280–580

N/mm$^2$ and 35–40 N/mm$^2$. In addition or in the alternative, the reinforcement layer 6 and the profile body of the spacer profile 1 respectively may have a breaking elongation of about 20–30% and about 500%. More preferably, the reinforcement material 6 has a breaking elongation of about 25–30%.

In addition or in the alternative, the reinforcement layer 6 and the profile body of the spacer profile 1 respectively may have a thermal conductivity of 15–35 W/m·K and equal to or less than 0.3 W/m·K, more preferably equal to or less than 0.15 W/ m·K. In addition or in the alternative, the reinforcement layer 6 and the profile body of the spacer profile 1 respectively have an elastic extensibility of about 0.2% and about 7%.

In order to demonstrate the advantages of the present designs when used with the preferred materials, 90° bends were introduced into four different spacer profiles using the automatic bending machine made by F.X. BAYER. The spacer profiles were at room temperature when bent and each spacer profile had a width (X direction) of 16 mm. The differences between the four spacer profiles are further described in the following.

The first spacer profile 1 was constructed according to the present teachings with side walls 3 having a height (Y direction) of 5.2 mm and a total height (Y direction from the outer surface of the base wall 2 to the outer surface of the upper wall 4) of 7.0 mm. The upper wall 4 had a width of 11.1 mm. The distance from the outer surface of the upper wall 4 to the base of groove 9 was 2.4 mm. A first portion of the hollow chamber 7 closest to the base wall 2 had an inner width (X direction) of 13.3 mm and a height of 3.1 mm. A second (adjoining) portion of the hollow chamber 7 closest to the upper wall 4 had a width of 9.43 mm and a height of 2.4 mm. The spacer body was formed of polypropylene. The reinforcement layer 6 was disposed on the outer surface of the side walls 3, upper wall 4 and the connecting portions 5. In addition, the reinforcement layer 6 had a thickness of 0.13 mm and was formed of stainless steel.

After bending the first spacer profile 1, the side walls had a height of 4.9 to 5.0 mm at the comer portions and the side walls 3 remained substantially flat and perpendicular to the base wall 2. No noticeable indentations were formed in the comer portions. In other words, the spacer profile 1 of the present teachings could be "cold" bent without significant distortion or deformation at the comer portions. Thus, the side walls 3 at the comer portions of the bent spacer profile 1 present a substantially flat surface for adhering to the window panes 23 of the assembled double glazing structure 20.

The second profile spacer was constructed entirely from stainless steel with the trapezoidal shape described by U.S. Pat. No. 6,601,994. Before bending, the side walls of the second profile spacer had a height of 4.4 mm. After bending, the side walls had a height of 3.4 mm at the comer portions and several relatively large indentations were present in the side walls at the comer portion. Thus, after bending, the stainless steel spacer profile having a trapezoidal shape showed significant distortions and deformation in the side walls at the comer portions thereof.

The third profile spacer was constructed entirely from aluminum with the trapezoidal shape described by U.S. Pat. No. 6,601,994. Before bending, the side walls of the third profile spacer had a height of 5.0 mm. After bending, the side walls had a height of 4.15 mm at the comer portions and several small indentations were present in the side walls at the comer portions. Thus, after bending, the aluminum spacer profile having a trapezoidal shape also showed significant distortions and deformation in the side walls at the corner portions thereof.

The fourth profile spacer was a composite material having the trapezoidal shape described by U.S. Pat. No. 6,601,994. The profile body was made of polypropylene. A reinforcement layer of stainless steel is embedded within the profile body and the reinforcement layer extended from one side wall to the other side wall, along the upper wall of the spacer profile. In other words, the reinforcement layer did not extend along the base wall of the spacer profile. Before bending, the side walls of the third profile spacer had a height of 4.7 mm. After bending, the side walls had a height of 4.3 mm at the comer portions and one relatively large indentation was present in the side walls at the corner portions of the spacer profile. Thus, after bending, the fourth (composite) spacer profile having a trapezoidal shape also showed significant distortions and deformation in the side walls at the comer portions thereof.

Thus, these experimental results demonstrate the clear advantages of the present spacer profiles 1, as compared to known designs that have a trapezoidal shape.

Furthermore, in another advantage of the present teachings, it is noted that the hollow chamber 11 of the first spacer profile described in paragraph [0074] has an inner cross-sectional area of 63.9 square millimeters. On the other hand, the improved spacer profile described in U.S. Pat. No. 6,339,909 having the same width (16 mm) and a height of 6.5 mm has an inner cross-sectional area of 46.1 square millimeters. Thus, the present designs provide an increased volume for accommodating the hygroscopic material without increasing the outer dimensional sizes of the spacer profile. Consequently, the present designs provide the additional advantage of being capable of maintaining the inner (gas) space of the assembled double glazing in a dry state for a longer period of time as compared to spacer profiles having similar outer dimensions (i.e., similar widths and heights).

Additional teachings relevant to, and advantageously combinable with the present teachings, are found in, e.g., commonly-owned U.S. Pat. Nos. 6,035,596, 6,389,779, 6,339,909, and 6,582,643 and U.S. Provisional Patent Application No. 60/518,215, the contents of which are hereby incorporated by reference as if fully set forth herein.

What is claimed is:

1. A spacer profile comprising:

a profile body comprising an elastically-plastically deformable material having a heat conductivity of less than about 0.3 W/(m·K), the profile body having defined therein:

a base wall, first and second side walls extending substantially perpendicularly from opposite terminal ends of the base wall, an upper wall extending substantially in parallel with the base wall, a first connecting segment connecting the first side wall to the upper wall, the first connecting segment defining a first inwardly curved or angled groove between the upper wall and the first side wall, a second connecting segment connecting the second side wall to the upper wall, the second connecting segment defining a second inwardly curved or angled groove between the upper wall and the second side wall, and a hollow chamber having a first space in communication with a second space, the first space being disposed adjacent to the base wall and the second space being disposed adjacent to the upper wall, the first space having a greater width than the second space, in which the width direction is defined as being parallel to the base wall and upper wall of the profile body, and a reinforcement layer provided in or on at least the upper wall, the first and second connecting segments, and the first and second side walls, the reinforcement layer having a heat conductivity of less than about 50 W/(m·K).

2. A spacer profile as in claim 1, wherein the hollow chamber has a cross-section selected from the group consisting of substantially T-shaped, substantially bell-shaped, substantially pyramid shaped and substantially stepped-shaped.

3. A spacer profile as in claim 2, wherein the first and second spaces of the hollow chamber are each substantially rectangular shaped.

4. A spacer profile as in claim 3, further comprising a hygroscopic material disposed within the hollow chamber, wherein a plurality of apertures are defined in the base wall.

5. A spacer profile as in claim 4, wherein the reinforcement layer has a breaking elongation of at least 20%.

6. A spacer profile as in claim 5, wherein the reinforcement layer comprises a stainless steel layer having a thickness of equal to or less than about 0.2 mm.

7. A spacer profile as in claim 6, wherein the reinforcement layer has a thickness of equal to or less than about 0.1 mm.

8. A spacer profile as in claim 7, wherein the heat conductivity of the reinforcement layer is less than about 15 W/(m·K).

9. A spacer profile as in claim 8, wherein the reinforcement layer has a breaking elongation of about 25–30%.

10. A spacer profile as in claim 9, wherein the spacer profile has an overall tensile strength of about 350–370 $N/mmn^2$.

11. A spacer profile as in claim 10, wherein the reinforcement layer extends continuously from the first side wall to the second side wall.

12. A spacer profile as in claim 11, wherein the profile body comprises at least one of polypropylene, polyethylene terephthalate, polyamide and polycarbonate.

13. A spacer profile as in claim 12, wherein the profile body is reinforced.

14. A spacer profile as in claim 13, wherein the profile body is reinforced with at least one of glass fiber, carbon fiber and natural fiber.

15. A spacer profile as in claim 12, wherein the profile body is not reinforced.

16. A spacer profile as in claim 12, further comprising at least one of fiberglass and talc dispersed within the profile body.

17. A spacer profile as in claim 12, wherein each of the first and second connecting segments includes a first portion extending substantially perpendicularly from the upper wall and a second portion connecting the first portion to the respective side wall.

18. A spacer profile as in claim 17, wherein the second portions each extend substantially perpendicularly from the respective side wall.

19. A spacer profile as in claim 18, wherein the first and second grooves each extend toward the base wall inward of a hypothetical line connecting a terminal end of the first side wall and a terminal end of the second side wall.

20. A spacer profile as in claim 19, wherein the first and second grooves each have a depth that is between about 0.1 and 1 times the length of the first portion.

21. A spacer profile as in claim 20, wherein the depth of the first and second grooves is between about 0.5 to 5 times the thickness of the side walls.

22. A spacer profile as in claim 21, wherein the depth of the first and second grooves is less than twice the width of the first and second grooves.

23. A spacer profile as in claim 22, wherein the grooves are one of substantially U-shaped and substantially V-shaped.

24. A spacer profile as in claim 22, wherein opposing walls of the grooves defined an angle of between about 60–90°.

25. An insulating window unit comprising:

a first window pane disposed substantially in parallel with a second window pane, a spacer frame formed by bending and connecting terminal ends of the spacer profile of claim 23, wherein the spacer frame is disposed between and supports the first and second window panes, the respective side walls are adhered to the first and second window panes, the base wall is oriented toward an inner space defined between the first and second window panes, and the upper wall is oriented toward an outer peripheral edge of the first and second window panes, and a mechanically stabilizing sealing material disposed on at least the upper wall.

26. An insulating window unit according to claim 25, wherein the mechanically stabilizing sealing material comprises at least one of a polysulfide, a polyurethane and a silicon.

27. An insulating window unit comprising:

a first window pane disposed substantially in parallel with a second window pane, a spacer frame formed by bending and connecting terminal ends of the spacer profile of claim 1, wherein the spacer frame is disposed between and supports the first and second window panes, the respective side walls are adhered to the first and second window panes, the base wall is oriented toward an inner space defined between the first and second window panes, and the upper wall is oriented toward an outer peripheral edge of the first and second window panes, and a mechanically stabilizing sealing material disposed on at least the upper wall.

28. A spacer profile comprising:

a profile body having a base wall, first and second side walls extending from the base wall, an upper wall extending substantially in parallel with the base wall, a first connecting segment connecting the first side wall to the upper wall and a second connecting segment connecting the second side wall to the upper wall, the first and second connecting segments respectively defining a substantially U-shaped or substantially V-shaped groove between the upper wall and the respective first and second side walls, the grooves each extending inward of a hypothetical line connecting terminal ends of the first and second side walls, wherein a hollow chamber is defined within the profile body, the hollow chamber having a cross-section providing a first substantially rectangular shaped space in communication with a second substantially rectangular space, the first substantially rectangular space being disposed adjacent to the base wall and the second substantially rectangular space being disposed adjacent to the upper wall, the first substantially rectangular space having a width greater than the second substantially rectangular space along a direction parallel to the base and upper walls, and wherein the profile body is integrally formed without interfaces from an elastically-plastically deformable material having a heat conductivity of equal to or less than about 0.3 W/(m·K), and a reinforcement layer permanently coupled to at least the upper wall, the first and second connecting segments, and the first and second side walls, the reinforcement layer having a thickness equal to or less than about 0.2 mm, a heat conductivity of equal to or less than about 50 W/(m·K), a breaking elongation of at least 20% and being substantially impermeable.

29. A spacer profile comprising:

an elongated profile body comprising an elastically-plastically deformable material having a heat conductivity of less than about 0.3 W/(m·K), wherein a transverse cross-section of the profile body integrally provides without interface therebetween:

a base wall extending in a width direction of the elongated profile body, first and second side walls extending from opposite terminal ends of the base wall in a height direction of the elongated profile body, the width direction being perpendicular to the height direction, each side wall comprising a terminal end opposite from the base wall, an upper wall extending substantially in parallel with the base wall, a first connecting segment having a first portion extending substantially perpendicularly from the upper wall and a second portion connecting the first portion to the first side wall, a first groove being defined by the at least one of the first and second portions and extending inward of a hypothetical line connecting the terminal ends of the first and second side walls, and a second connecting segment having a first portion extending substantially perpendicularly from the upper wall and a second portion connecting the first portion to the second side wall, a second groove being defined by the first and second portions and extending inward of a hypothetical line connecting the terminal ends of the first and second side walls, wherein the first and second grooves each have a depth that is at least one of: (a) between about 0.1 and 1 times the length of the first portions and (b) between about 0.5 to 5 times the thickness of the side walls, and a hollow chamber defining in communication:

a centrally disposed space bounded in the height direction by the base wall and the upper wall, a first laterally disposed space bounded in the height direction by the base wall and the second portion of the first connecting segment and bounded in the width direction by the first side wall and the centrally disposed space, and a second laterally disposed space bounded in the height direction by the base wall and the second portion of the second connecting segment and bounded in the width direction by the second side wall and the centrally disposed space, and a reinforcement layer permanently coupled to at least the upper wall, the first and second connecting segments, and the first and second side walls, the reinforcement layer having a heat conductivity of less than about 50 WI(m·K).

30. A spacer profile as in claim 29, wherein the second portions each extend substantially perpendicularly from the respective side walls, the hollow chamber has a cross-section selected from the group consisting of substantially T-shaped, substantially bell-shaped, substantially pyramid shaped and substantially stepped-shaped, and the reinforcement layer has a breaking elongation of about 25–30% and comprises stainless steel having a thickness of equal to or less than about 0.1 mm, wherein the heat conductivity of the reinforcement layer is equal to or less than about 15 W/(m·K), the reinforcement layer extends continuously from the first side wall to the second side wall, the depth of the first and second grooves is less than twice the width of the first and second grooves and the profile body comprises at least one of polypropylene, polyethylene terephthalate, polyamide and polycarbonate and the profile body is reinforced with a fiber material.

* * * * *